United States Patent
Becker

(10) Patent No.: US 10,664,668 B2
(45) Date of Patent: May 26, 2020

(54) USING MAGNETIZED PARTICLES TO APPLY INFORMATION TO THE SURFACE OF AN OBJECT AND TO READ THE INFORMATION

(71) Applicant: Bogen Electronic GmbH, Berlin (DE)

(72) Inventor: Torsten Becker, Berlin (DE)

(73) Assignee: Bogen Electronic GmbH, Berlin (DE)

( * ) Notice: Subject to any disclaimer, the term of this patent is extended or adjusted under 35 U.S.C. 154(b) by 0 days.

(21) Appl. No.: 16/010,204

(22) Filed: Jun. 15, 2018

(65) Prior Publication Data

US 2018/0293411 A1    Oct. 11, 2018

Related U.S. Application Data

(63) Continuation-in-part of application No. PCT/EP2016/081228, filed on Dec. 15, 2016.

(30) Foreign Application Priority Data

Dec. 15, 2015    (DE) .......................... 10 2015 121 822

(51) Int. Cl.
*G06K 19/00* (2006.01)
*G06K 7/08* (2006.01)
(Continued)

(52) U.S. Cl.
CPC .......... *G06K 7/087* (2013.01); *B41M 5/0023* (2013.01); *B41M 7/0072* (2013.01); *B42D 25/25* (2014.10);
(Continued)

(58) Field of Classification Search
USPC ......................... 235/435, 439, 449, 487, 493
See application file for complete search history.

(56) References Cited

U.S. PATENT DOCUMENTS

| 3,458,688 A | 7/1969 | Garry et al. ................. 235/61.7 |
| 4,094,804 A | 6/1978 | Shimoiizaka .............. 252/62.52 |

(Continued)

FOREIGN PATENT DOCUMENTS

| DE | 69838830 | 7/1997 |
| DE | 10038296 | 8/2000 |

(Continued)

*Primary Examiner* — Matthew Mikels
(74) *Attorney, Agent, or Firm* — Imperium Patent Works; Darien K. Wallace

(57) ABSTRACT

Information is written onto the surface of an object using both an optically identifiable pattern and subregions that exhibit differing magnetic properties. The optically identifiable pattern is printed onto a printed region on the surface of the object using a printing medium that contains magnetic particles. The printed region includes both a first subregion that exhibits a first prevailing magnetization direction and a second subregion that exhibits a second prevailing magnetization direction. The first magnetization direction differs from the second magnetization direction. The first and second magnetization directions are imparted to the first and second subregions by magnetic fields being applied to the magnetic particles. An edge between the first subregion and the second subregion does not coincide with any boundary of the optically identifiable pattern. The printed region contains both optically encoded information and magnetically encoded information. Additional information is decoded using both the optically and magnetically encoded information.

22 Claims, 4 Drawing Sheets

(51) Int. Cl.
*B42D 25/41* (2014.01)
*B42D 25/26* (2014.01)
*B42D 25/25* (2014.01)
*B42D 25/369* (2014.01)
*B41M 5/00* (2006.01)
*B41M 7/00* (2006.01)
*C09D 5/00* (2006.01)
*C09D 11/03* (2014.01)
*G06K 1/12* (2006.01)
*G06K 7/14* (2006.01)

(52) U.S. Cl.
CPC ........... *B42D 25/26* (2014.10); *B42D 25/369* (2014.10); *B42D 25/41* (2014.10); *C09D 5/00* (2013.01); *C09D 11/03* (2013.01); *G06K 1/125* (2013.01); *G06K 7/1417* (2013.01)

(56) References Cited

U.S. PATENT DOCUMENTS

| | | | |
|---|---|---|---|
| 5,039,559 A * | 8/1991 | Sang | B03C 1/01 106/457 |
| 5,720,012 A | 2/1998 | McVeigh et al. | 395/113 |
| 5,927,621 A | 7/1999 | Ziolo et al. | 241/21 |
| 8,236,192 B2 | 8/2012 | Breton et al. | 252/62.55 |
| 2006/0150854 A1 | 7/2006 | Benninger et al. | 101/489 |
| 2007/0060820 A1 | 3/2007 | Lofgren et al. | 600/481 |
| 2012/0225264 A1 | 9/2012 | Villwock | 428/201 |
| 2014/0063100 A1 | 3/2014 | Bonino et al. | 347/14 |
| 2014/0077485 A1 * | 3/2014 | Raksha | B41M 7/0072 283/67 |
| 2014/0306099 A1 | 10/2014 | Oguchi et al. | G01D 5/34707 |

FOREIGN PATENT DOCUMENTS

| | | |
|---|---|---|
| DE | 10314631 | 4/2003 |
| DE | 602004013155 | 7/2003 |
| DE | 102005042895 | 9/2005 |
| DE | 102007052477 | 11/2007 |
| DE | 102008033693 | 7/2008 |
| DE | 102010041398 | 9/2010 |
| DE | 102013022028 | 12/2013 |
| EP | 0557149 | 1/1993 |
| GB | 878056 | 10/1957 |
| WO | WO 2013/139969 | 3/2013 |
| WO | WO 2014/072172 | 10/2013 |
| WO | WO 2015/032600 | 8/2014 |
| WO | WO 2015/180569 | 5/2015 |

* cited by examiner

USING MAGNETIZED PARTICLES TO APPLY INFORMATION TO THE SURFACE OF AN OBJECT AND TO READ THE INFORMATION

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2016/081228, filed on Dec. 15, 2016, and published as WO 2017/102967 A1 on Jun. 22, 2017, which in turn claims priority from German Application No. 102015121822.4, filed in Germany on Dec. 15, 2015. This application is a continuation-in-part of International Application No. PCT/EP2016/081228, which is a continuation of German Application No. 102015121822.4. International Application No. PCT/EP2016/081228 is pending as of the filing date of this application, and the United States is an elected state in International Application No. PCT/EP2016/081228. This application claims the benefit under 35 U.S.C. § 119 from German Application No. 102015121822.4. The disclosure of each of the foregoing documents is incorporated herein by reference.

TECHNICAL FIELD

The invention relates to an object comprising a printed region, a method for applying information to the object, and a method for reading information from the object.

BACKGROUND

Conventionally, products are identified in different ways. For example, a product can be provided with a barcode or a two-dimensional QR code (Quick Response Code), which are for example printed on the packaging of the product. The barcode and the QR code can be read using an optical method, and the product can be identified through comparison with a database. A product can also be provided with a serial number that can be engraved onto the product. Here, too, the serial number can be read using an optical method. It is disadvantageous, however, that the optical reading method is rendered error prone by soiling. It is also possible to identify a product magnetically. For example, a ticket for a parking lot has a magnetic film that can be written to by means of magnetization. The written film can then be read using a magnetic method.

It is also conventional to identify products or living organisms by tagging them with an RFID (radio-frequency identification) transponder. The transponder has an identification code that can be read using a reader device. The RFID identification method, however, has the disadvantage of being relatively expensive, particularly the transponder.

An object of the invention is to create an object that can be identified by marking the object with information in an alternative way. In addition, an alternative method is sought for applying the information to the object and for reading the information from the object.

SUMMARY

The invention relates to an object that includes a printed region on which information is encoded. An optically identifiable pattern is printed onto the printed region using a colored printing medium that contains magnetizable and/or magnetic particles. The printed region has at least two subregions whose magnetic properties differ from one another. Examples of uses for the object on which information is written include: an industrial product, a ticket for an event, a ticket for public transportation, a ticket for a toll payment, a ticket for a parking garage, a package for a consumer product, a label for a consumer product, and a package for a drug. Examples of information that can be encoded in the subregions include: a product identification number, a production batch number, a production location, a production date, an expiration date, a testing agency certification mark, a product name, a serial number, a time and a characteristic product symbol.

Information is written onto the surface of an object using both an optically identifiable pattern and subregions that exhibit differing magnetic properties. The optically identifiable pattern is printed onto a printed region on the surface of the object using a colored printing medium that contains magnetic particles. The printed region includes both a first subregion that exhibits a first magnetic property and a second subregion that exhibits a second magnetic property. The first magnetic property differs from the second magnetic property. In one embodiment, the first magnetic property is a first prevailing magnetization direction of the magnetic particles in the first subregion, and the second magnetic property is a second prevailing magnetization direction of the magnetic particles in the second subregion, where the first direction differs from the second direction. The first magnetic property and the second magnetic property are imparted to the first and second subregions by the magnetic particles. For example, the first magnetization direction is imparted to the first subregion by a magnetic field being applied to the first subregion such that the magnetic particles of the first subregion orient themselves along the field lines of the magnetic field.

An edge between the first subregion and the second subregion does not coincide with any boundary of the optically identifiable pattern. For example, an edge section of the first subregion is positioned independently of, and does not coincide with, any edge of the optically identifiable pattern. The printed region includes a non-homogenous region that has either a uniform color and a non-uniform magnetization or a uniform magnetization and a non-uniform color.

The printing medium can include a pigment that contains the magnetic particles. Alternatively, the magnetic particles are contained directly in the printing medium. The printing medium includes the magnetic particles in a concentration of 40% to 70% by volume. The magnetic particles have an average longest dimension that is less than 2 µm. Examples of the magnetic particles include hard magnetic particles, pigments, micromagnets, ceramic particles and rare earth metals.

In one embodiment, the first magnetic property is a first magnetic anisotropy with a first prevailing magnetization direction, and the second magnetic property is a second magnetic anisotropy with a second prevailing magnetization direction. The first prevailing magnetization direction differs from the second prevailing magnetization direction.

A first piece of information is encoded in both the first and second subregions, and a second piece of information is encoded in the optically readable pattern. The first piece of information can be decoded only if the second piece of information is first read.

In another example, the first piece of information is encoded in both the first and second subregions, and the second piece of information is encoded in the optically readable pattern. But the first piece of information includes a logical key that must be used to decode the second piece of information.

A method for encoding information onto an object includes the steps of imparting different magnetic properties to subregions of a printed region and printing an optically identifiable pattern onto the printed region. A first magnetic property is imparted to a first subregion of the printed region of the object, and a second magnetic property is imparted to a second subregion of the printed region. The first magnetic property differs from the second magnetic property. The optically identifiable pattern is printed onto the printed region with a printing medium that includes a binding agent and magnetic particles. The first magnetic property and the second magnetic property are provided to the first subregion and the second subregion by the magnetic particles. The first magnetic property is imparted to the first subregion by applying a magnetic field to the first subregion that orients the magnetic particles of the printing medium along field lines of the magnetic field before the binding agent cures. The first magnetic property is imparted to the first subregion by aligning the magnetic particles in the printing medium after the printing medium has been printed onto the printed region.

A method for reading information from an object includes the steps of decoding optically encoded information and decoding magnetically encoded information. In a first step, a first piece of information is decoded. The first piece of information is optically encoded in an optically identifiable pattern that is printed onto a printed region of the object. The optically identifiable pattern is printed with a printing medium that contains magnetic particles. In a next step, a second piece of information is decoded. The second piece of information is magnetically encoded in a first subregion and a second subregion of the printed region. The first subregion exhibits a first magnetic property, and the second subregion exhibits a second magnetic property. The first magnetic property differs from the second magnetic property. The second piece of information is magnetically encoded using the first magnetic property and the second magnetic property. The second piece of information is magnetically encoded by applying a magnetic field to the first subregion that orients the magnetic particles of the printing medium along field lines of the magnetic field. A third piece of information is decoded based on both the first piece of information that is optically encoded and the second piece of information that is magnetically encoded.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
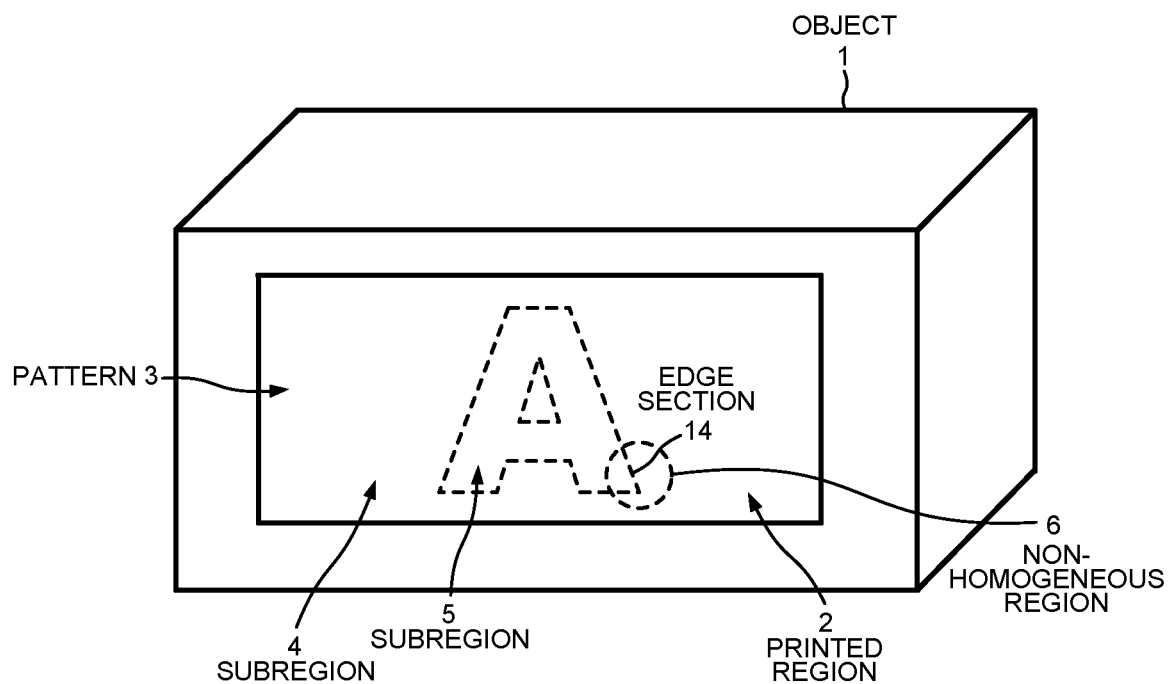
FIG. 1 shows a first object.

FIG. 1 shows an object 1 that has an optically identifiable pattern 3 arranged in a printed region 2. The printed region 2 has at least two subregions 4-5 whose magnetic properties differ from one another. The pattern 3 is printed with a colored printing medium that contains magnetizable and/or magnetic particles 7.

The object 1 has a printed region 2 in which an optically identifiable pattern 3 is located. The optically identifiable pattern 3 is printed with a colored printing medium that contains magnetizable and/or magnetic particles 7. The printed region 2 has at least two subregions 4-5 with magnetic properties that differ from each other. The different magnetic properties can result from the fact that the subregions 4-5 are magnetized or unmagnetized, the subregions 4-5 are hard magnetic or soft magnetic, the subregions 4-5 are magnetically anisotropic or magnetically isotropic, the subregions 4-5 are anisotropic in different directions in space, and/or the subregions 4-5 are ferromagnetic or non-ferromagnetic. The colored printing medium can be of any color including the color black and/or the color white. The printing medium can, for example, be a magnetic ink. The magnetic ink can, for example, be applied to the object 1 by hand or by means of an inkjet printer.

Different magnetic properties can be used to encode additional information in the pattern 3 that is printed on the object 1. This allows the additional information to be written onto the object 1 in a space-saving manner, or it allows more information to be encoded in a particular region of the object 1 than would be possible to include in the pattern 3 alone. The subregions with the different magnetic properties can be created in such a way that they are imperceptible to the human eye or are invisible to optical measuring methods so that it is possible to conceal information in the pattern 3.

The at least two subregions 4-5 are positioned independently of the optically identifiable pattern 3 in such a way that at least an edge section of one of the subregions is positioned so that it does not coincide with an edge section of any monochrome pattern region of the pattern 3.

The printed region 2 includes at least one non-homogenous region that has either a uniform color and a non-uniform magnetization, or a uniform magnetization and a non-uniform color. It is thus possible to combine color information and magnetic information. The information can be encoded in such a way that the information can be read only if the color information and the magnetic information are combined. It is thus possible to encrypt information more securely than would be possible if the color information and the magnetic information were encrypted separately from each other.

The printing medium has a colorant and/or pigments. The pigments contain the magnetizable and/or magnetic particles 7. The printing medium is composed 40% to 70% by volume of the magnetizable and/or magnetic particles 7. In addition, the printing medium primarily contains a binding agent that ensures that the printing medium adheres to the object 1. The printing medium can also include a solvent, which is used to dissolve the colorant. By filling the printing medium with 40% to 70% by volume of the magnetizable and/or magnetic particles 7, a high magnetizability of the pattern 3 is achieved with a simultaneous strong adhesion. A filling degree of about 50% by volume of the particles 7 is particularly beneficial. For cost reasons, it is advantageous for the pigments to contain the magnetizable and/or magnetic particles 7 because then it is unnecessary additionally to add the magnetizable particles 7 to the colorant and/or the pigments.

The magnetizable particles 7 can be composed of pigments, ceramic particles, and/or rare earth metals, whereas the magnetic particles 7 can be hard magnetic particles, pigments, micromagnets, ceramic particles, and/or rare earth metals. The magnetizable and/or magnetic particles 7 have an average longest dimension that is less than 2 μm. It is advantageous to use hard magnetic particles because they have strong magnetic field strengths. Rare earth metals have high magnetic field strengths. It is advantageous to use pigments that can function both as a magnet and as a colorant. Ceramic metals are advantageous due to their resistance to chemicals. If for example the magnetizable particles 7 are spherical, then the 2-μm size limitation indicates the particle diameter. If the form of the magnetizable particles 7 is other than spherical, then the 2-μm size limitation refers to the longest dimension occurring in the magnetizable particle. The magnetizable and/or magnetic particles 7 are particularly easy to orient in an external magnetic field because of their small size, particularly when they are hard magnetic particles that are already in a magnetized state. Using these small magnetic particles allows a particularly strong magnetization of the subregions to be achieved.

The small size of the particles 7, particularly when they are hard magnetic particles that are already in a magnetized state, facilitates an easier orientation of the particles in an external magnetic field and thus permits a particularly strong magnetization of the subregions to be achieved.

The printed region 2 on object 1 includes a first anisotropic region that has a magnetic anisotropy with a prevailing magnetization direction. The printed region 2 has a second anisotropic region with a prevailing magnetization direction that differs from the magnetization direction of the first anisotropic region. Consequently, transitions from one subregion to the other subregion can be detected based on the change in the direction of the magnetic field strength vectors. The pattern 3 can also accommodate additional information that is encoded by means of the direction of the magnetic field strength vectors.

A first piece of information from a group that can be magnetically read from the subregions and a second piece of information that can be optically read from the pattern 3 can be evaluated based on their dependence on each other and on other pieces of information in the group. The information can be encoded based on its inter-dependence. In one example, the information can be decoded only if both the optically readable data and the magnetically readable data are read. One piece of information from the group contains a logical key that is used to decode and/or to verify the other piece of information contained in the group. Consequently, the key for decoding the encrypted data is provided along with the object 1.

In various embodiments, the object 1 can take the form of an industrial product, an industrially produced product, a ticket for an event, a ticket for local public transportation, a ticket for a toll payment, a ticket for a parking garage or lot, a package for orders, a package for products, a label and a package for drugs. Information that can be determined and read from the two subregions 4-5 includes a product identification, a production batch number, a production location, a production date, an expiration date, a testing agency certification mark for the object 1, a product name, a serial number, a characteristic product symbol and a time. From the at least two subregions 4-5, it is also possible to determine usage information about a use of the object 1 in a device provided for using the object 1. The use of the object 1 in the device can thereby be automated.

One of the at least two subregions 4-5 is essentially unmagnetized, whereas another of the at least two subregions 4-5 has a magnetic pole orientation and/or a magnetic anisotropy perpendicular or parallel to a printing surface of the printed region. The subregions 4-5 can include a binary encoding that can be read using a magnetic reading method. The error-free reading of the encoded information can be achieved using the transition from an essentially unmagnetized subregion to a magnetized subregion or using the orientation of the magnetic field strength vectors that are either perpendicular or parallel to the printing surface. Binary encoded information can be easily read if the encoding is performed based on unmagnetized and magnetized subregions or on different subregions whose magnetic field strength vectors are oriented in opposite directions.

A method for encoding information onto the object 1 involves providing two subregions of the printed region 2 with magnetic properties that differ from one another. An optically identifiable pattern 3 is located in the printed region 2. The optically identifiable pattern 3 is printed with a colored printing medium that contains magnetizable and/or magnetic particles 7. The method involves imparting differing magnetic properties to the at least two subregions 4-5 of the printed region 2.

The differing magnetic properties are imparted to the subregions while the printed region 2 is being applied to the object 1. The magnetic properties of the subregions can also be applied at any subsequent time. The information that is written into the two subregions 4-5 can be deleted or over-written with new information using strong magnetic fields. It is thus possible to change the information that is written into the printed region 2.

In order to prevent the clumping or agglomeration of the magnetizable and/or magnetic particles 7 before printing the printing medium onto the printing region 2, the printing medium is stirred or made to flow through a sieve. The mesh openings of the sieve are dimensioned so that individual magnetizable and/or magnetic particles 7 can penetrate the sieve, but clumps or agglomerates of particles are retained by the sieve.

The method of encoding information onto the object 1 involves magnetizing at least one of the subregions of the printed region 2 so that at least two subregions 4-5 with differing magnetic properties are present in the printed region 2.

The method includes the step of generating a magnetically anisotropic region in the printed region 2 by forming, before the binding agent of the printing medium has cured, a magnetic field in at least one part of the printed region 2 that orients the magnetizable and/or magnetic particles 7 of the printing medium along the field lines of the magnetic field. This step is particularly suited to orienting hard magnetic particles 7 that are already in the magnetized state in the printing medium. The subregions with the different magnetic properties are formed when the magnetic field orients the magnetizable and/or magnetic particles 7, and this orientation is frozen in place when the binding agent cures. The information that is written using the subregions 4-5 with differing magnetic properties can be deleted or overwritten with new information by melting the binding agent and generating a new magnetic field in at least part of the printed region 2.

A method for reading information from the object 1 involves decoding both optically encoded and magnetically encoded information. The object 1 has an optically identifiable pattern 3 that is printed onto printed region 2. The magnetically encoded information has a magnetic anisotropy of a subregion of the pattern 3. The optically identifiable pattern 3 is printed with a colored printing medium that contains magnetizable and/or magnetic particles 7. The printed region 2 has at least two subregions 4-5 whose magnetic properties differ from one another. The method includes the step of decoding a piece of optically encoded information based on the pattern 3. The method also includes the step of decoding a piece of magnetically encoded information that has been magnetically read from the magnetic subregions. A particular piece of information can be written redundantly as both optically encoded information and magnetically encoded information. This permits the particular piece of information to be reliably read even if the location of the optically encoded information becomes soiled. Analogously, if the magnetically encoded information is overwritten by a magnetic field, then the information can still be reliably read from the optically encoded information. The method for reading information from the object 1 can also involve the step of determining an additional piece of information based on both the optically encoded information and the magnetically encoded information.

FIGS. 1 and 3-6 show that object 1 has the printed region 2. An optically identifiable pattern 3 is arranged in the printed region 2. The pattern 3 is printed with a colored printing medium that contains magnetizable and/or magnetic particles 7. The printed region 2 has at least two subregions 4-5 whose magnetic properties differ from one another.

The magnetic properties of the subregions 4 and 5 can differ from one another in various ways. For example, the two subregions 4-5 can be hard magnetic and soft magnetic, the two subregions 4-5 can be magnetically anisotropic and magnetically isotropic, the two subregions 4-5 can be anisotropic in different directions in space, and/or the two subregions 4-5 can be ferromagnetic and non-ferromagnetic.

The printing medium includes the magnetic or magnetizable particles 7 in a concentration of 40% to 70% by volume. The printing medium preferably has a filling degree of 40% to 70% by volume, in particular a filling degree of about 50% by volume, of the magnetizable and/or magnetic particles 7. The remainder of the printing medium is essentially a solvent and/or a binding agent. The printing medium or ink can include a colorant and/or pigments. The pigments can include the magnetizable and/or magnetic particles 7, or the pigments can consist entirely of the magnetizable and/or magnetic particles 7.

The magnetizable and/or magnetic particles 7 can have hard magnetic particles, pigments, micromagnets, ceramic particles, and/or rare earth metals. The average size of the magnetizable and/or magnetic particles 7 is preferably less than 2 μm (microns). If the magnetizable and/or magnetic particles 7 are spherical, then the size indicates the particle diameter. If the form of the magnetizable and/or magnetic particles 7 is other than spherical, then the size is the longest dimension occurring in the magnetizable and/or magnetic particles 7.

In first object 1 of FIG. 1, the two subregions 4-5 are positioned independently of the optically identifiable pattern 3 in such a way that at least an edge section 14 of one of the subregions 4-5 is located so that it does not coincide with an edge section of a monochrome pattern region of the pattern 3. In first object 1, the printed region 2 is printed in monochrome and has the shape of a rectangle. The printed region 2 has the two subregions 4-5, of which the subregion 5 has a specific, readable shape. In this case, the specific, readable shape is a letter. But subregion 5 could also have any other shape. The rest of the printed region 2 is composed of the subregion 4.

Figure 2:
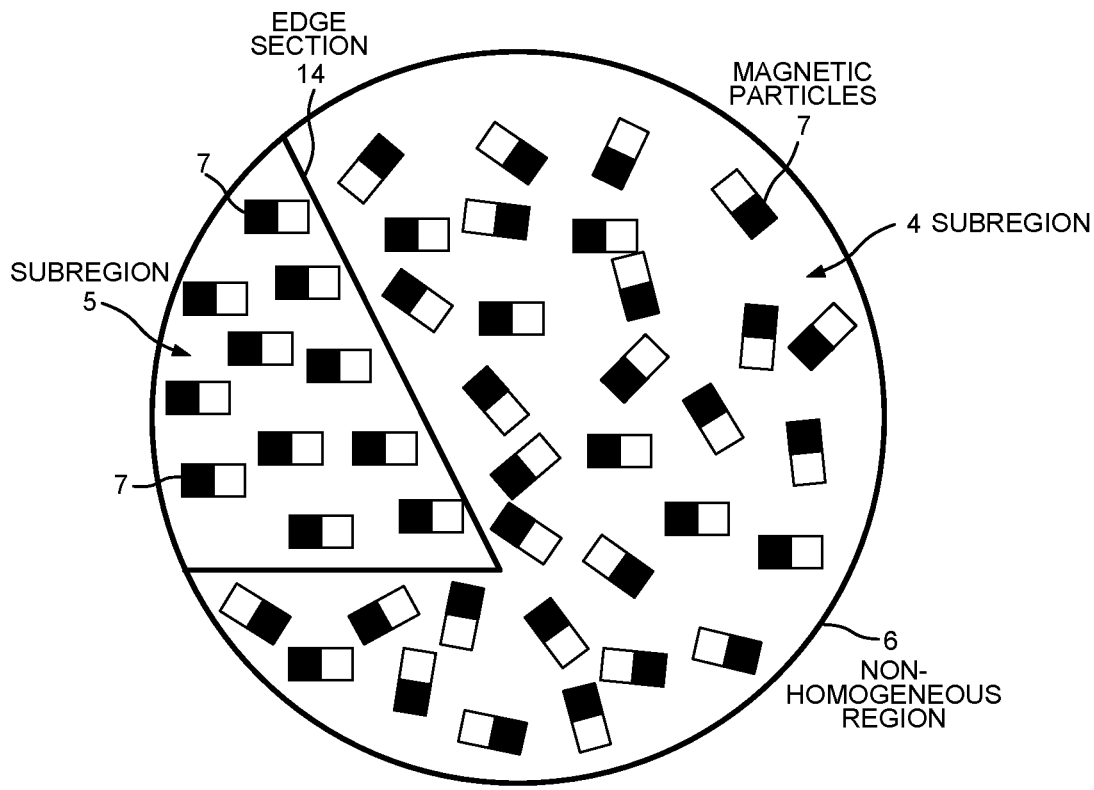
FIG. 2 is a more detailed view of the first object of FIG. 1.

FIG. 2 shows a region of FIG. 1 in more detail, specifically of a portion of the printed region 2 that contains both subregion 4 and subregion 5. FIG. 2 illustrates that both of the subregions 4-5 contain the magnetizable and/or magnetic particles 7. Each of the magnetizable and/or magnetic particles 7 shown in FIG. 2 has a north pole and a south pole, which means that each is magnetized. For example, the magnetizable and/or magnetic particles 7 of FIG. 2 can be hard magnetic particles. In the subregion 5, the magnetizable and/or magnetic particles 7 are all oriented in the same direction resulting in a macroscopic magnetization of subregion 5, which means that the subregion 5 is magnetized. The magnetizable and/or magnetic particles 7 in subregion 4 are randomly oriented in all spatial directions so that no macroscopic magnetization is present, which means that subregion 4 is not magnetized.

As is clear from FIGS. 1-2, the printed region 2 has at least one non-homogenous region 6 that has a uniform color but a non-uniform magnetization. Alternatively, it is conceivable for the non-homogenous region 6 to have a uniform magnetization but a non-uniform color. It is also conceivable for the printed region to have both at least one non-homogenous region 6 with a uniform color and non-uniform magnetization and at least one other non-homogenous region 6 with a non-uniform color and a uniform magnetization.

Figure 3:
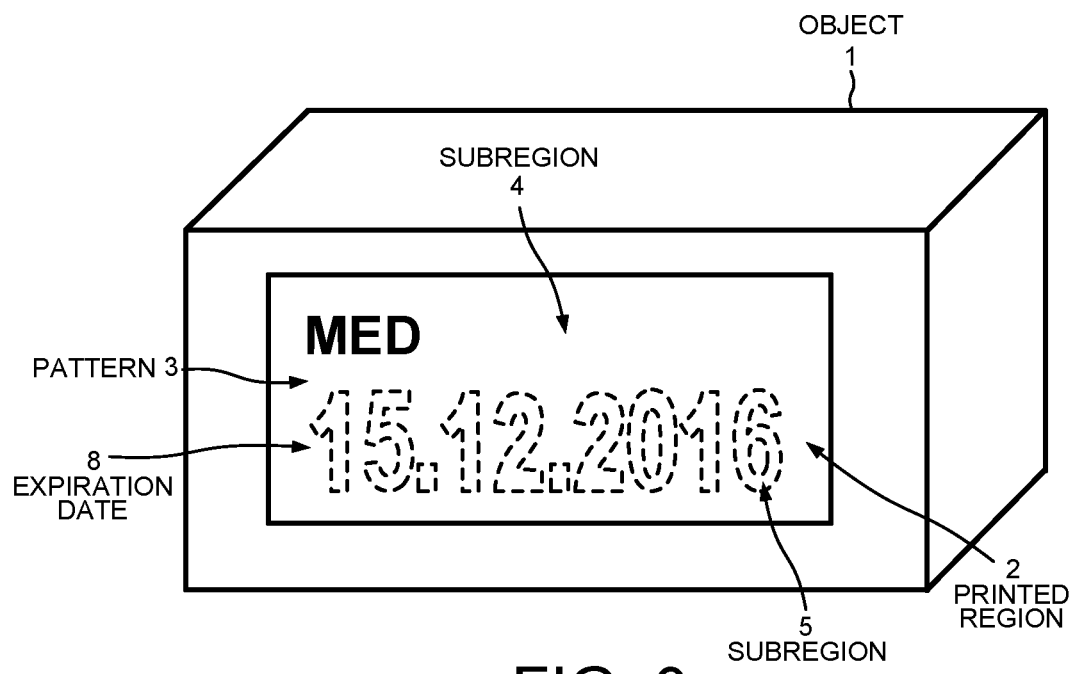
FIG. 3 shows a second object.

FIG. 3 shows a second object 1 that differs from the first object 1 of FIGS. 1-2 in that the subregion 5 is embodied in the form of an expiration date 8. In addition, the printed region 2 is not monochrome, but instead contains writing, such as the letters "MED".

Figure 4:
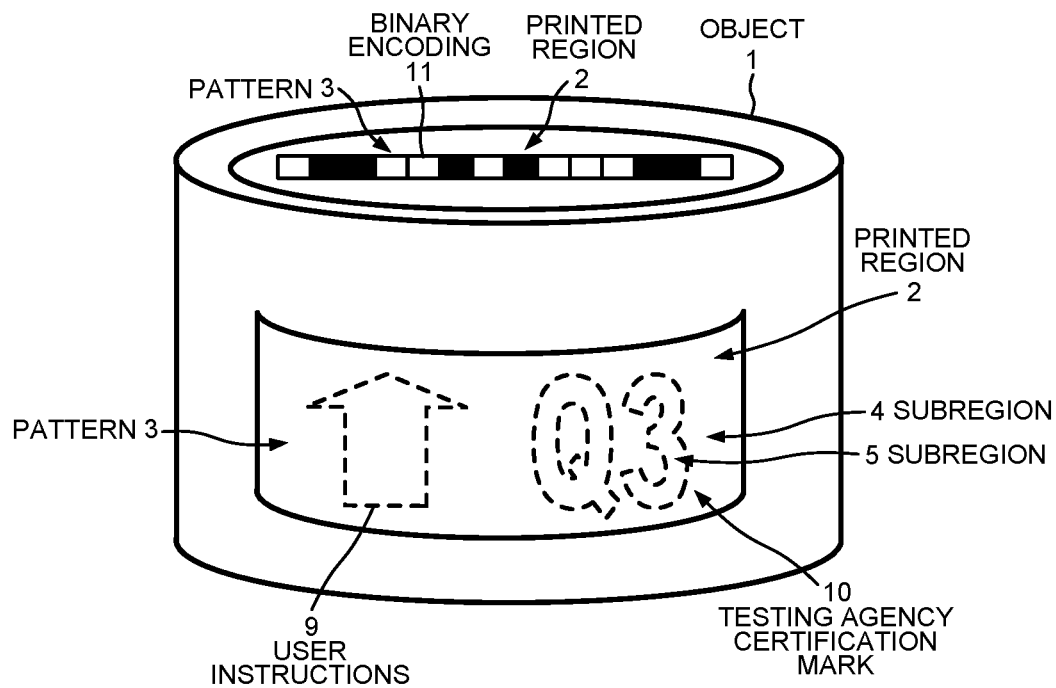
FIG. 4 shows a third object.

FIG. 4 shows a third object 1 that has at least two subregions 4-5 that can be used to indicate a testing agency certification mark 10. The two subregions 4-5 can also be used to communicate user instructions or to indicate usage information 9 about how to use the third object 1 in a device provided for such use. For example, the usage information can be information about the direction in which the third object 1 should be inserted into the device. The two subregions 4-5 of FIG. 4 can also be used to convey a binary encoding 11 that can be read using a magnetic reading method.

Figure 5:
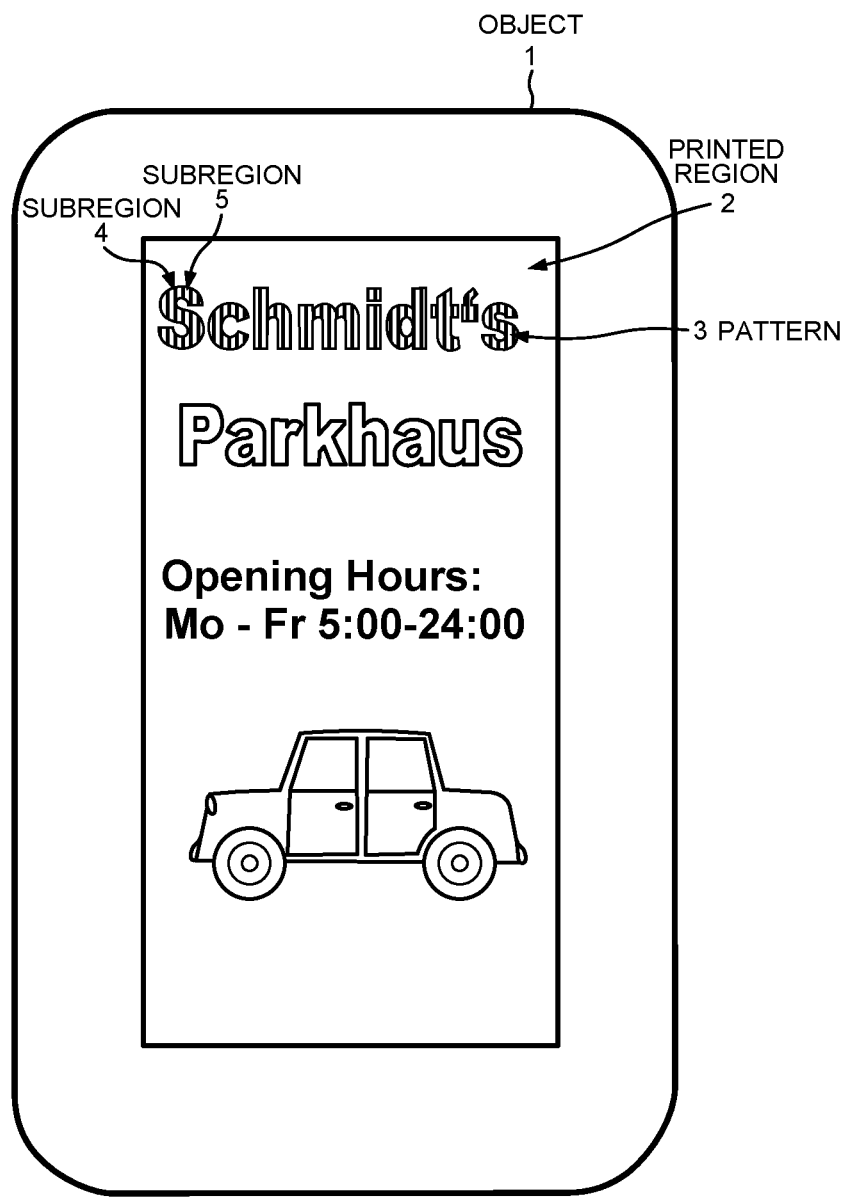
FIG. 5 shows a fourth object.

FIG. 5 shows a fourth object 1 that is used as a ticket for a parking garage or lot. The fourth object 1 has the printed region 2 onto which optically readable information is printed. Information that is applied to the ticket can be magnetically read from the two subregions 4-5, such as time information.

Figure 6:
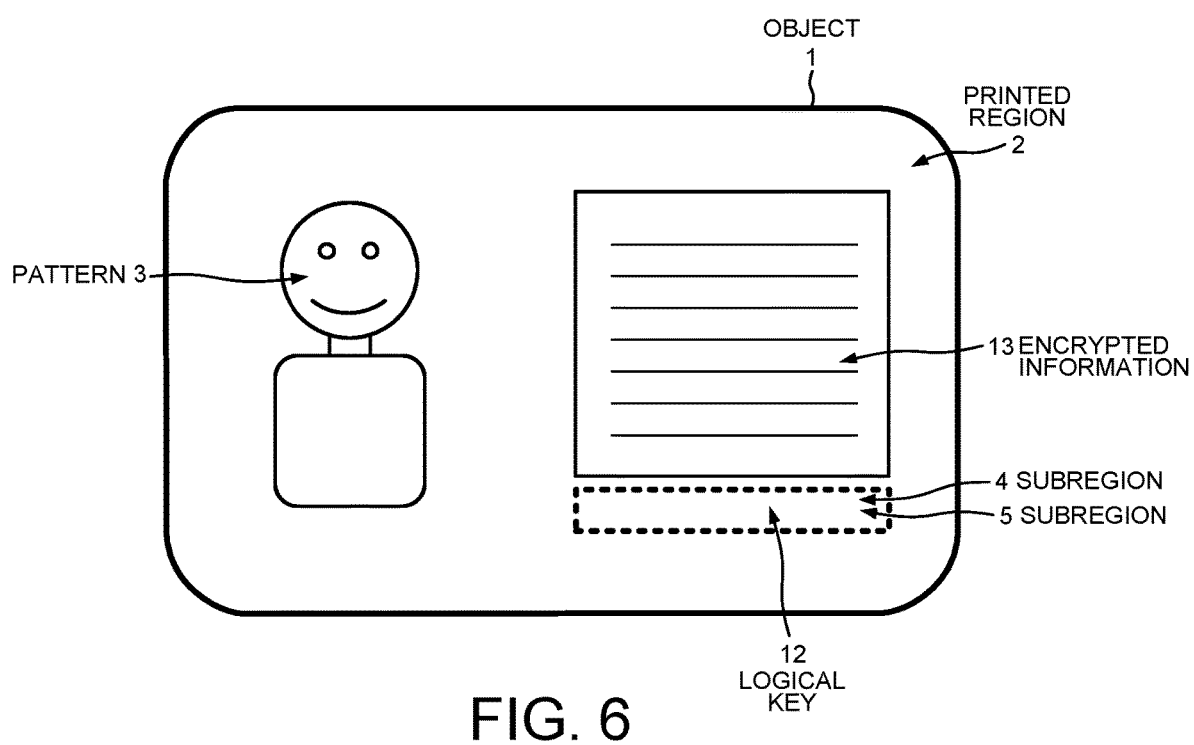
FIG. 6 shows a fifth object.

FIG. 6 shows a fifth object 1 from which one piece of information that is magnetically read and another piece of information is optically read. One piece of information can be magnetically read from the subregions 4-5 and another piece of information that is encoded within the optically readable pattern 3 can be optically read. Each of these two pieces of information can be evaluated based on its dependence with the other piece of information. One piece of information is encoded as a logical key 12 in the subregions 4-5 and can be used to decode the other piece of information and/or to verify the other piece of information. For example, the other piece of information 13 is encrypted using the optically identifiable pattern 3. The logical key 12 in the fifth object 1 of FIG. 6 is contained in the at least two subregions 4-5, and the encrypted information 13 is decoded and read using the optically identifiable pattern 3. Alternatively, it is conceivable for the logical key 12 to be composed of the optically identifiable pattern 3 and for the encrypted information to be contained in the at least two subregions 4-5.

The object 1 shown in FIGS. 1-6 can be an industrial product, a ticket for an event, a ticket for local public transport, a ticket for a toll payment, a ticket for parking, a package for orders, a package for products and/or a package for drugs. Using the two subregions 4-5 of the object 1 of FIGS. 1-6, it is possible to determine a product identification, a production batch number, a production location, a production date, an expiration date 8, a time, and/or a testing agency certification mark 10 for the object 1.

The method for applying or writing information to the objects 1 of FIGS. 1-6 involves the step of magnetizing the at least two subregions 4-5 in the printed region 2 with magnetic properties that differ from each other. The method can also include the step of forming a first magnetic field in at least one part of the printed region before a binding agent of the printing medium is cured such that the orientation of the magnetizable and/or magnetic particles 7 of the printing medium align along the field lines of the first magnetic field and thereby generate a magnetically anisotropic region. The method can also include the step of, before the binding agent of the printing medium is cured, forming a second magnetic field whose magnetic field lines are oriented in the opposite direction from the first magnetic field in another part of the printed region such that the orientation of the magnetizable and/or magnetic particles 7 of the printing medium align along the field lines of the second magnetic field and thereby generate another magnetically anisotropic region.

A method for reading information from the objects 1 of FIGS. 1-6 involves the steps of identifying a piece of optically encoded information that can be inferred from the pattern 3 and decoding a piece of magnetically encoded information that can be magnetically read from the magnetic subregions 4-5. The magnetically encoded information can, for example, be determined by measuring the induction, the Hall effect and/or the magnetoresistance effect. In addition, the method can include step of identifying an additional piece of information that depends on the optically encoded information and the magnetically encoded information. The magnetically encoded information can be stored in a magnetically anisotropic subregion of the pattern 3.

The invention is explained in greater detail below based on four examples.

In a first example, the object 1 has a printed region 2. An optically identifiable pattern 3 is disposed in the printed region 2. The optically identifiable pattern 3 is printed with a colored printing medium that contains magnetizable and/or magnetic particles 7. The printed region 2 has at least two subregions 4-5 that have different magnetic properties which differ from each other. The subregion 4 has ferromagnetic particles as the magnetizable and/or magnetic particles 7, and the subregion 5 has no magnetizable and/or magnetic particles 7.

The object 1 in the first example can be produced in such a way that the at least two subregions 4-5 with differing magnetic properties from each other are magnetized in the printed region 2 by using two different printing mediums. The printing medium for the subregion 4 contains ferromagnetic particles, and the printing medium for the subregion 5 contains no ferromagnetic particles. The two printing mediums can be the same color or can be different colors.

A second example involves a method for encoding information onto an object 1. The object 1 includes an optically identifiable pattern 3 located in a printed region 2. The optically identifiable pattern 3 is printed with a colored printing medium that contains magnetizable and/or magnetic particles 7. The method involves the steps of stirring the printing medium and magnetizing two subregions 4-5.

The printing medium is stirred before the pattern 3 is printed and/or before the printing medium is deposited. The pattern 3 is printed by dispensing the printing medium through a sieve whose mesh openings are dimensioned so that individual magnetizable and/or magnetic particles 7 can pass through the sieve, but clumps or agglomerates of particles are retained by the sieve. The method involves magnetizing two subregions 4-5 of the printed region 2 that have magnetic properties that differ from one another. The method of the second example is particularly suited to using ink as the printing medium.

In a third example, an object 1 has an optically identifiable pattern 3 located in a printed region 2. The optically identifiable pattern 3 is printed with a colored printing medium that contains magnetizable and/or magnetic particles 7 so that the printed region 2 encodes optically readable information. The printed region 2 has at least two subregions 4-5 whose magnetic properties differ from one another such that the printed region 2 contains magnetically readable information. The optically readable information and the magnetically readable information contain the same information. In this case, it is possible for the pattern 3 to be identical to one of the subregions 4 or 5. It is also possible for one of the subregion 4 or 5 to be different from the pattern 3. In this case, the pattern 3 is writing, and the at least two subregions 4-5 form a binary code.

In a fourth example, an object 1 has a printed region 2 in which an optically identifiable pattern 3 is located. The optically identifiable pattern 3 is printed with a colored printing medium that contains magnetizable and/or magnetic particles 7. The printed region 2 has at least two subregions 4-5 whose magnetic properties differ from one another.

A first piece of information that can be magnetically read from the subregions 4-5 can be evaluated based on its dependence on a second piece of information that can be optically read and that is contained within the optically identifiable pattern 3. Conversely, the second piece of information that can be optically read and that is contained within the optically identifiable pattern 3 can be evaluated based on its dependence on the first piece of information that can be magnetically read from the subregions 4-5. The first or the second piece of information can be a logical key that can be used to decode the other piece of information and/or to verify the other piece of information. At least one of the subregions 4, 5 in this case is square and the logical key 12 is the size of the square. In another example, the pattern 3 includes a square, and the logical key 12 is the size of the square.

REFERENCE NUMERALS 1 object
2 printed region
3 optically identifiable pattern
4 first subregion
5 second subregion
6 non-homogeneous region
7 magnetizable and/or magnetic particles
8 expiration date
9 usage information
10 certification mark
11 binary encoding 12 logical key
13 encrypted information
14 edge section Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An object, comprising:
    a printed region, wherein the printed region comprises:
        a first subregion that exhibits a first magnetic property; and
        a second subregion that exhibits a second magnetic property, wherein the first magnetic property differs from the second magnetic property, wherein an optically identifiable pattern is printed onto the printed region using a colored printing medium that contains magnetic particles, wherein the first magnetic property and the second magnetic property are imparted to the first subregion and the second subregion by the magnetic particles, and wherein at least one edge between the first subregion and the second subregion does not coincide with any boundary of the optically identifiable pattern.

2. The object of claim 1, wherein an edge section of the first subregion is positioned independently of, and does not coincide with, any edge of the optically identifiable pattern.

3. The object of claim 1, wherein the printed region includes a non-homogenous region, and wherein the non-homogenous region exhibits a uniform color and a non-uniform magnetization.

4. The object of claim 1, wherein the printed region includes a non-homogenous region, and wherein the non-homogenous region exhibits a uniform magnetization and a non-uniform color.

5. The object of claim 1, wherein the printing medium includes a pigment, and wherein the pigment contains the magnetic particles.

6. The object of claim 1, wherein the printing medium includes the magnetic particles in a concentration of 40% to 70% by volume.

7. The object of claim 1, wherein the magnetic particles have an average longest dimension that is less than 2 µm.

8. The object of claim 1, wherein the magnetic particles are taken from the group consisting of: hard magnetic particles, pigments, micromagnets, ceramic particles and rare earth metals.

9. An object, comprising:
    a printed region, wherein the printed region comprises:
        a first subregion that exhibits a first magnetic property; and
        a second subregion that exhibits a second magnetic property, wherein the first magnetic property differs from the second magnetic property, wherein an optically identifiable pattern is printed onto the printed region using a colored printing medium that contains magnetic particles, wherein the first magnetic property and the second magnetic property are imparted to the first subregion and the second subregion by the magnetic particles, wherein the first magnetic property is a first magnetic anisotropy with a first prevailing magnetization direction and the second magnetic property is a second magnetic anisotropy with a second prevailing magnetization direction, and wherein the first prevailing magnetization direction differs from the second prevailing magnetization direction.

10. The object of claim 1, wherein a first piece of information is encoded in the first subregion and the second subregion, wherein a second piece of information is encoded in the optically readable pattern, and wherein the first piece of information can be decoded only if the second piece of information is first read.

11. The object of claim 1, wherein a first piece of information is encoded in the first subregion and the second subregion, wherein the first piece of information includes a logical key, wherein a second piece of information is encoded in the optically readable pattern, and wherein the second piece of information can be decoded only by using the logical key.

12. An object, comprising:
    a printed region, wherein the printed region comprises:
        a first subregion that exhibits a first magnetic property; and
        a second subregion that exhibits a second magnetic property, wherein the first magnetic property differs from the second magnetic property, wherein an optically identifiable pattern is printed onto the printed region using a colored printing medium that contains magnetic particles, wherein the first magnetic property and the second magnetic property are imparted to the first subregion and the second subregion by the magnetic particles, wherein a first piece of information is encoded in the optically readable pattern, wherein the first piece of information includes a logical key, wherein a second piece of information is encoded in the first subregion and the second subregion, and wherein the second piece of information can be decoded only by using the logical key.

13. The object of claim 1, wherein the object is taken from the group consisting of: an industrial product, a ticket for an event, a ticket for public transportation, a ticket for a toll payment, a ticket for a parking garage, a package for a consumer product, a label for a consumer product, and a package for a drug.

14. The object of claim 1, wherein information is encoded in the first subregion and the second subregion, and wherein the information is taken from the group consisting of: a product identification number, a production batch number, a production location, a production date, an expiration date, a testing agency certification mark, a product name, a serial number, a time and a characteristic product symbol.

15. A method for encoding information onto an object, comprising:
    imparting a first magnetic property to a first subregion of a printed region of the object;
    imparting a second magnetic property to a second subregion of the printed region of the object, wherein the first magnetic property differs from the second magnetic property; and
    printing an optically identifiable pattern onto the printed region with a printing medium that contains magnetic particles, wherein the first magnetic property and the second magnetic property are imparted to the first subregion and the second subregion by the magnetic particles, and wherein at least one edge between the first subregion and the second subregion does not coincide with any boundary of the optically identifiable pattern.

16. The method of claim 15, wherein the printing medium includes a binding agent, and wherein the first magnetic property is imparted to the first subregion by applying a magnetic field to the first subregion that orients the magnetic particles of the printing medium along field lines of the magnetic field before the binding agent cures.

17. The method of claim 15, wherein the first magnetic property is imparted to the first subregion by aligning the magnetic particles in the printing medium after the printing medium has been printed onto the printed region.

18. A method for reading information from an object, comprising:
    decoding a first piece of information, wherein the first piece of information is optically encoded in an optically identifiable pattern that is printed onto a printed region of the object, and wherein the optically identifiable pattern is printed with a printing medium that contains magnetic particles; and
    decoding a second piece of information, wherein the second piece of information is magnetically encoded in a first subregion and a second subregion of the printed region, wherein the first subregion exhibits a first magnetic property and the second subregion exhibits a second magnetic property, wherein the first magnetic property differs from the second magnetic property, and wherein the second piece of information is magnetically encoded using the first magnetic property and the second magnetic property, and wherein at least one edge between the first subregion and the second subregion does not coincide with any boundary of the optically identifiable pattern.

19. The method of claim 18, wherein the second piece of information is magnetically encoded by applying a magnetic field to the first subregion that orients the magnetic particles of the printing medium along field lines of the magnetic field.

20. The method of claim 18, further comprising:
    decoding a third piece of information based on both the first piece of information that is optically encoded and the second piece of information that is magnetically encoded.

21. An object, comprising:
    a first subregion of a printed region that exhibits a first magnetic property; and
    a second subregion of the printed region that exhibits a second magnetic property, wherein the first magnetic property differs from the second magnetic property, wherein an optically identifiable pattern is printed onto the printed region using a colored printing medium that contains magnetic particles, wherein the first magnetic property and the second magnetic property are imparted to the first subregion and the second subregion by the magnetic particles, and wherein a first piece of information that is encoded in the first subregion and the second subregion can be deleted and over-written with a second piece of information.

22. The object of claim 21, wherein at least one edge between the first subregion and the second subregion does not coincide with any boundary of the optically identifiable pattern.

* * * * *